(12) United States Patent
Jang et al.

(10) Patent No.: US 10,704,652 B2
(45) Date of Patent: Jul. 7, 2020

(54) POWER TRANSMISSION APPARATUS FOR VEHICLE

(71) Applicants: Hyundai Motor Company, Seoul (KR); Kia Motors Corporation, Seoul (KR)

(72) Inventors: Cheol Ho Jang, Busan (KR); Ki Dong Kim, Anyang-si (KR); Seong Wook Hwang, Gunpo-si (KR); Kijong Park, Hwaseong-si (KR); Yong Uk Shin, Suwon-si (KR); Seongwook Ji, Gunpo-si (KR); Ki Tae Kim, Incheon (KR); Chon Ok Kim, Yongin-si (KR); Wonmin Cho, Hwaseong-si (KR); Hyun Sik Kwon, Seoul (KR); Ilhan Yoo, Hwasun-Gun (KR); Juhyeon Park, Suwon-si (KR); Minho Chae, Incheon (KR); Dongwoo Kim, Incheon (KR); Hye Jin Lim, Seoul (KR); Soonki Eo, Ansan-si (KR); Yong Sug Choi, Hwaseong-si (KR); Sun Sung Kwon, Anyang-si (KR)

(73) Assignees: Hyndai Motor Company, Seoul (KR); Kia Motors Corporation, Seoul (KR)

( * ) Notice: Subject to any disclaimer, the term of this patent is extended or adjusted under 35 U.S.C. 154(b) by 114 days.

(21) Appl. No.: 16/202,548

(22) Filed: Nov. 28, 2018

(65) Prior Publication Data
US 2020/0063830 A1 Feb. 27, 2020

(30) Foreign Application Priority Data
Aug. 22, 2018 (KR) .................. 10-2018-0098116

(51) Int. Cl.
*F16H 3/00* (2006.01)
*F16H 3/78* (2006.01)
(Continued)

(52) U.S. Cl.
CPC .............. *F16H 3/006* (2013.01); *B60K 6/365* (2013.01); *F16H 3/724* (2013.01); *F16H 3/78* (2013.01);
(Continued)

(58) Field of Classification Search
None
See application file for complete search history.

(56) References Cited

U.S. PATENT DOCUMENTS 7,575,529 B2 * 8/2009 Holmes .................. B60K 6/365
475/5
8,323,142 B2 12/2012 Masumoto
(Continued)

FOREIGN PATENT DOCUMENTS

EP 3121483 A 1/2017

*Primary Examiner* — Timothy Hannon
(74) *Attorney, Agent, or Firm* — Morgan, Lewis & Bockius LLP

(57) ABSTRACT

A power transmission apparatus configured for a vehicle may include a first input shaft fixedly connected to a motor/generator, a second input shaft selectively connectable to the first input shaft, a third input shaft selectively connectable to the first input shaft, a torque mediating shaft externally disposed with the first input shaft, an intermediate shaft, an idle shaft, an output shaft, a first shifting section selectively receiving a torque from the third input shaft, shifting the received torque and outputting the shifted torque, a second shifting section shifting a torque from the first input shaft to the torque mediating shaft, or stopping a rotation of the torque mediating shaft, and a third shifting section selectively receiving a torques from the first and second shifting sections and a torque from the second input and outputting shifted torque to the output shaft.

12 Claims, 2 Drawing Sheets

(51) Int. Cl.
*B60K 6/365* (2007.10)
*F16H 3/72* (2006.01)

(52) U.S. Cl.
CPC .. *F16H 2003/007* (2013.01); *F16H 2003/008* (2013.01); *F16H 2200/0021* (2013.01); *F16H 2200/0065* (2013.01); *F16H 2200/2007* (2013.01); *F16H 2200/2053* (2013.01)

(56) References Cited

U.S. PATENT DOCUMENTS

| | | | |
|---|---|---|---|
| 9,022,891 B2* | 5/2015 | Phillips | F16H 3/78 475/218 |
| 10,081,240 B2* | 9/2018 | Lee | B60K 6/543 |
| 2013/0031990 A1 | 2/2013 | Singh et al. | |
| 2020/0047602 A1* | 2/2020 | Chae | B60K 6/365 |

* cited by examiner

FIG. 2

| | Shift-stage | ECL | CL1 | CL2 | CL3 | CL4 | B1 | B2 | SN1 | | SN2 | | |
|---|---|---|---|---|---|---|---|---|---|---|---|---|---|
| | | | | | | | | | ICDG | N | IDG2 | N | IDG3 |
| Engine mode / Parallel mode | REV | ● | ● | | | ● | | | ○ | ● | | | ● |
| | FD1 | ● | | | | ● | ● | | ● | | ○ | ● | ○ |
| | FD2 | ● | | | ● | ● | | | ● | | ○ | ● | ○ |
| | FD3 | ● | ● | | | ● | | | ○ | ● | ● | | |
| | FD4 | ● | | ● | | ● | | | ○ | ● | ○ | ● | ○ |
| | FD5 | ● | ● | ● | | | | | ○ | ● | ● | | |
| | FD6 | ● | | ● | ● | | | | ● | | ○ | ● | ○ |
| | FD7 | ● | | ● | | | ● | | ● | | ○ | ● | ○ |
| | FD8 | ● | | ● | | | | ● | ● | | ○ | ● | ○ |
| | FD9 | ● | ● | ● | | | | | ○ | ● | | | ● |
| EV mode | REV | | ● | | | ● | | | ○ | ● | | | ● |
| | FD1 | | | | | ● | ● | | ● | | ○ | ● | ○ |
| | FD2 | | | | ● | ● | | | ● | | ○ | ● | ○ |
| | FD3 | | ● | | | ● | | | ○ | ● | ● | | |
| | FD4 | | | ● | | ● | | | ○ | ● | ○ | ● | ○ |
| | FD5 | | ● | ● | | | | | ○ | ● | ● | | |
| | FD6 | | | ● | ● | | | | ● | | ○ | ● | ○ |
| | FD7 | | | ● | | | ● | | ● | | ○ | ● | ○ |
| | FD8 | | | ● | | | | ● | ● | | ○ | ● | ○ |
| | FD9 | | ● | ● | | | | | ○ | ● | | | ● |

○ : Preliminary engagement available

POWER TRANSMISSION APPARATUS FOR VEHICLE

CROSS-REFERENCE TO RELATED APPLICATION

The present application claims priority to Korean Patent Application No. 10-2018-0098116 filed on Aug. 22, 2018, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle for realizing multiple shifting stages by adding two planetary gear sets in a dual clutch transmission structure and achieving the vehicle to run in an electric vehicle mode and a parallel hybrid mode by adding one motor/generator.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The DCT may include two clutch devices and a gear train of a manual transmission. The DCT selectively transmits torque input from an engine to two input shafts through two clutches, changes the torque selectively transmitted to the two input shafts through the gear train, and outputs the changed torque.

The DCT is used to realize a compact transmission achieving a forward speed higher than a fifth forward speed. The DCT is used as an automated manual transmission that does not require a driver's manual manipulation by controlling two clutches and synchronizers by a controller.

Compared with an automatic transmission with planetary gear sets, the DCT has excellent power delivery efficiency, simplifies change and addition of components for achieving multiple gear stages, and improves fuel economy.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus configured for a vehicle having advantages of realizing multiple shifting stages by adding two one planetary gear sets in a dual clutch transmission structure and achieving the vehicle to run in an engine driving mode, an electric vehicle mode and a parallel hybrid mode by adding one motor/generator, simplifying its internal structure by reducing the number of components, improving fuel economy by minimizing the weight, and improve the mountability by reducing the volume.

A power transmission apparatus configured for a vehicle according to an exemplary embodiment of the present invention may include an engine including an engine output shaft, a motor/generator selectively connectable to the engine output shaft, a first input shaft fixedly connected to the motor/generator, a second input shaft formed as a hollow shaft, coaxially and externally disposed with the first input shaft without rotational interference therebetween, and selectively connectable to the first input shaft, a third input shaft formed as a hollow shaft, coaxially and externally disposed with the second input shaft without rotational interference therebetween, and selectively connectable to the first input shaft, a torque mediating shaft formed as a hollow shaft and coaxially and externally disposed with the first input shaft without rotational interference therebetween, an intermediate shaft disposed in parallel with the first input shaft, an idle shaft disposed in parallel with the first input shaft, an output shaft disposed in parallel with the first input shaft and outputting an output torque, a first shifting section including first, second, third, and fourth gear sets and the first shifting section selectively receiving a torque from the third input shaft, shifting the received torque and outputting the shifted torque, a second shifting section including a first planetary gear set having a first ring gear fixedly connected to the first input shaft, and the second shifting section shifting a torque from the first input shaft to the torque mediating shaft in reduced rotation speed or as inputted, or the second shifting section stopping a rotation of the torque mediating shaft, and a third shifting section including a second planetary gear set having a second sun gear fixedly connected to the output shaft, and the third shifting section selectively receiving a torques from the first and second shifting sections through the second gear set and a torque from the second input shaft through a fifth gear set and outputting shifted torque to the output shaft.

The first gear set may include a first drive gear fixedly connected to the third input shaft, and a first driven gear fixedly connected to the intermediate shaft and externally gear-meshed with the first drive gear, the second gear set may include a second drive gear coaxially and externally disposed with the intermediate shaft, an intermediate drive gear coaxially and externally disposed with the torque mediating shaft and externally gear-meshed with second drive gear, a second driven gear fixedly connected a second ring gear of the second planetary gear set and externally gear-meshed with the intermediate drive gear, the third gear set may include a third drive gear coaxially and externally disposed with the intermediate shaft and a third driven gear fixedly connected to the idle shaft and externally gear-meshed with the third drive gear, the fourth gear set may include a fourth drive gear which is fixedly connected to the idle shaft and externally gear-meshed with the intermediate drive gear, and the fifth gear set gear may include a fifth drive gear fixedly connected to the second input shaft and a fifth driven gear fixedly connected to a second planet carrier of the second planetary gear set and externally gear-meshed with the fifth drive gear.

The intermediate drive gear may be selectively synchronously connected with torque mediating shaft through a first synchronizer, and the second drive gear and the third drive gear may be selectively synchronously connected to the intermediate shaft through a second synchronizer.

The first planetary gear set may further include a first planet carrier fixedly connected to the torque mediating shaft and selectively connectable to a transmission housing and a first sun gear selectively connectable to the transmission housing.

The first planetary gear set may be a single pinion planetary gear set.

The second planetary gear set may further include a second ring gear receiving the torques from the first and second shifting sections and a second planet carrier receiving the torque from the second input shaft, and the second sun gear fixedly connected to the output shaft may be selectively connectable to the second ring gear.

The second planetary gear set may be a single pinion planetary gear set.

The power transmission apparatus may further include five clutches each selectively connecting a corresponding pair of shafts, a shaft and a rotation element, or a corresponding pair of rotation elements, and two brakes selectively connecting a rotation element to the transmission housing.

The five clutches may include an engine clutch disposed between the engine output shaft and the first input shaft, a first clutch disposed between the first input shaft and the third input shaft, a second clutch disposed between the first input shaft and the second input shaft, a third clutch disposed between the first ring gear and the first planet carrier, and a fourth clutch disposed between the second ring gear and the output shaft, and the two brakes may include a first brake disposed between the first sun gear and the transmission housing, and a second brake disposed between the first planet carrier and the transmission housing.

A power transmission apparatus configured for a vehicle according to an exemplary embodiment of the present invention may realize multiple shifting stages by adding two planetary gear sets in a dual clutch transmission structure and simplify its internal structure by reducing the number of components, improving fuel economy by minimizing the weight, and improve the mountability by reducing the volume.

Also, the power transmission apparatus may achieve the vehicle to run in an engine driving mode, an electric vehicle mode and a parallel hybrid mode by adding one motor/generator.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart for a power transmission apparatus configured for a vehicle according to an exemplary embodiment of the present invention.

Figure 1:
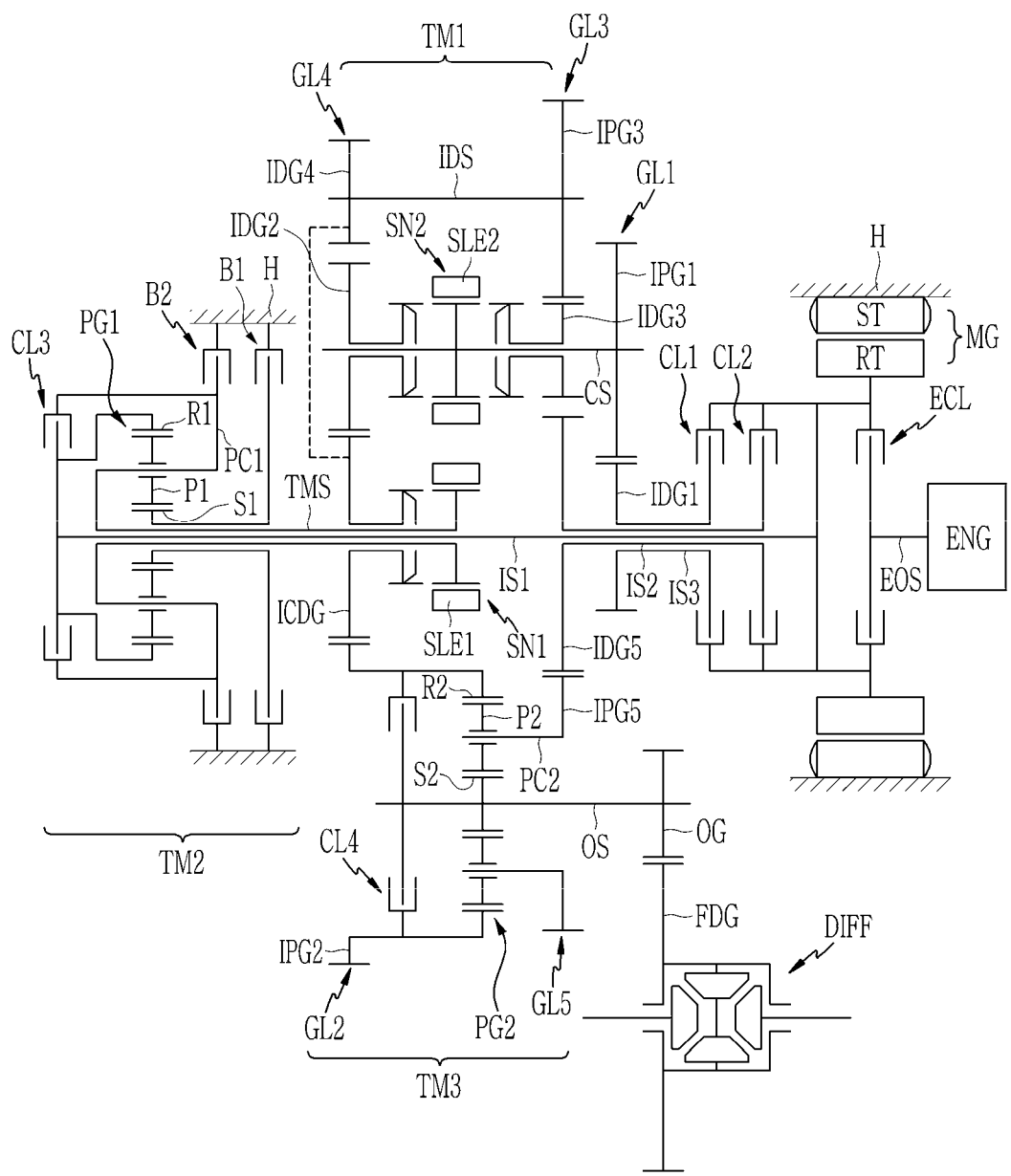
FIG. 1 is a schematic view of a power transmission apparatus configured for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of a power transmission apparatus configured for a vehicle according to an exemplary embodiment of the present invention.

Referring to FIG. 1, a power transmission apparatus configured for a vehicle according to an exemplary embodiment of the present invention includes an engine ENG, a motor/generator MG, first, second, and third input shafts IS1, IS2, and IS3, a torque mediating shaft TMS, an intermediate shaft CS, idle shaft IDS, first, second, third shifting sections TM1, TM2, and TM3 and an output shaft OS.

The engine ENG is a primary power source and a variety of typical engines such as a gasoline engine or a diesel engine that utilizes fossil fuel may be used as the engine ENG.

The motor/generator MG as an auxiliary power source may act as a motor and also as a generator, and includes a stator ST and a rotor RT, where the stator ST is fixed to a transmission housing H and the rotor RT is rotatably supported within the stator ST.

Torques from the engine ENG and/or the motor/generator MG are shifted into a plurality of fixed shifting stages in the first and second shifting sections TM1 and TM2, and a torque selectively transmitted from the engine ENG through the second input shaft IS2 are shifted into a plurality of shifting stages in the third shifting section TM3 and output through the output shaft OS.

The first, second, third input shaft IS1, IS2, and IS3 and the torque mediating shaft TMS are coaxially disposed and the intermediate shaft CS, output shaft OS and idle shaft IDS are parallel with the first, second, third input shaft IS1, IS2, and IS3 and the first torque mediating shaft TMS.

The motor/generator MG is disposed to be rear of the engine ENG and the rotor RT of the motor/generator MG is selectively connectable to an output shaft EOS of the engine ENG interposing an engine clutch ECL.

The first input shaft IS1 is connected to the rotor RT of the motor/generator MG and the first input shaft IS1 receives torques of the engine ENG and the motor/generator MG and transmits to the second shifting section TM2.

The second input shaft IS2 is formed as a hollow shaft, coaxially and externally disposed with the first input shaft IS1 without rotational interference therebetween, and selectively connectable to the first input shaft IS1 for selectively transfers the torques of the engine ENG and the motor/generator MG to the third shifting section TM3.

The third input shaft IS3 is formed as a hollow shaft, coaxially and externally disposed with the second input shaft IS2 without rotational interference therebetween, and selectively connectable to the first input shaft IS1 for selectively transfers the torques of the engine ENG and the motor/generator MG to the first shifting section TM1.

The torque mediating shaft TMS is formed as a hollow shaft and coaxially and externally disposed with the first input shaft IS1 without rotational interference therebetween.

The first shifting section TM1 includes first, second, third, and fourth gear sets GL1, GL2, GL3 and GL4 disposed on the first and third input shafts IS1 and IS3, the intermediate shaft CS and the idle shaft IDS.

The second shifting section TM2 includes a first planetary gear set PG1 including three rotation elements and the first planetary gear set PG1 is a single pinion planetary gear set. The first planetary gear set PG1 includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1.

The first sun gear S1 is selectively connectable to the transmission housing H, the first planet carrier PC1 is fixedly connected to the torque mediating shaft TMS selectively connectable to the transmission housing H, and the first ring gear R1 is fixedly connected to the first input shaft IS1.

The first planetary gear set PG1 may integrally rotate by selectively connecting two rotation elements of the three rotation elements. In the exemplary embodiment of the present invention, the first planet carrier PC1 and the first ring gear R1 may be selectively connectable with.

Accordingly, in the second shifting section TM2, when the first sun gear S1 is fixed to the transmission housing H, the rotation speed of the first input shaft IS1, which is input through the first ring gear R1, is decelerated and output to the torque mediating shaft TMS through the first planet carrier PC1. When the first planet carrier PC1 and the first ring gear R1 are selectively connectable, the first planetary gear set PG1 integrally rotates and outputs a rotation speed as inputted and when the first planet carrier PC1 is selectively connectable to the transmission housing H, the rotation of the, torque mediating shaft TMS is stopped.

The third shifting section TM3 includes a second planetary gear set PG2 including three rotation elements and the second planetary gear set PG2 is a single pinion planetary gear set. The second planetary gear set PG2 includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2.

The second planetary gear set PG2 is disposed on the output shaft OS, the second sun gear S2 is fixedly connected to the output shaft OS, the second planet carrier PC2 is connected to the second input shaft IS2 through a fifth gear set GL5, and the second ring gear R2 is connected to first and second shifting sections TM1 and TM2 through the second gear set GL2.

The second planetary gear set PG2 may integrally rotate by selectively connecting two rotation elements of the three rotation elements. In the exemplary embodiment of the present invention, the second sun gear S2 is selectively connectable to the second ring gear R2 through the output shaft OS.

In the second planetary gear set PG2, the rotation speeds inputted through the second and fifth gear sets GL2 and GL5 are independently output as they are, or the rotation speeds inputted through the second and fifth gear sets GL2 and GL5 with different rotation speeds are combined and output.

The configuration of the first, second, third, fourth, and fifth input gear sets GL1, GL2, GL3, GL4, and GL5 will be described in detail below.

The first gear set GL1 includes a first drive gear IDG1 fixedly connected to the third input shaft IS3, and a first driven gear IPG1 fixedly connected to the intermediate shaft CS and externally gear-meshed with the first drive gear IDG1.

The second gear set GL2 includes a second drive gear IDG2 coaxially and externally disposed with the intermediate shaft CS, an intermediate drive gear ICDG coaxially and externally disposed with the torque mediating shaft TMS and externally gear-meshed with second drive gear IDG2, a second driven gear IPG2 fixedly connected to the second ring gear R2 of the second planetary gear set PG2 and externally gear-meshed with the intermediate drive gear ICDG.

The third gear set GL3 includes a third drive gear IDG3 coaxially and externally disposed with the intermediate shaft CS and a third driven gear IPG3 fixedly connected to the idle shaft IDS and externally gear-meshed with the third drive gear IDG3.

The fourth gear set GL4 includes a fourth drive gear IDG4 which is fixedly connected to the idle shaft IDs and externally gear-meshed with the intermediate drive gear ICDG.

The fifth gear set GL5 includes a fifth drive gear IDG5 fixedly connected to the second input shaft IS2 and a fifth driven gear IPG5 fixedly connected to a second planet carrier PC2 of the second planetary gear set PG2 and externally gear-meshed with the fifth drive gear IDG5.

The intermediate drive gear ICDG is selectively synchronously connect with torque mediating shaft TMS through a first synchronizer SN1.

The second drive gear IDG2 and the third drive gear IDG3 are selectively synchronously connected to the intermediate shaft CS through a second synchronizer SN2.

The second drive gear IDG2 is involved in shifts of the third forward speed and the fifth forward speed, the third drive gear IDG3 is involved in shift of the ninth forward speed, and the intermediate drive gear ICDG is involved in shifts of the first forward, second, sixth and seventh speed and gear ratios of the drive gears IDG2, IDG3 and ICDG2 and the driven gears externally gear-meshed with the drive gears IDG2, IDG3 and ICDG2 are set for multi shifting stages.

The output shaft OS receives torque input from the third shifting section TM3 and transmits the received torque to a differential DIFF through the output gear OG and the final reduction gear FDG.

Furthermore, five engagement elements of an engine clutch ECL and first to fourth clutches CL1, CL2, CL3, and CL4 are disposed between rotation members such as various shafts, and two engagement elements of brakes B1 and B2 are disposed between a rotation member and the transmission housing H.

The engine clutch ECL is disposed between the engine output shaft EOS (i.e., engine crankshaft) and the first input shaft IS1 and selectively connects the engine output shaft EOS and first input shaft IS1.

The first clutch CL1 is disposed between the first input shaft IS1 and the third input shaft IS3 and selectively connects the first input shaft IS1 and the third input shaft IS3.

The second clutch CL2 is disposed between the first input shaft IS1 and the second input shaft IS2 and selectively connects the first input shaft IS1 and the second input shaft IS2.

The third clutch CL3 is disposed between the first ring gear R1 and the first planet carrier PC1, and selectively connects the first ring gear R1 and the first planet carrier PC1 so that the first planetary gear set PG1 integrally rotates.

The fourth clutch CL4 is disposed between the second ring gear R2 and the output shaft OS fixedly connected to the second sun gear S2, and selectively connects the second ring gear R2 and the second sun gear S2 so that the second planetary gear set PG2 integrally rotates.

That is, the third and fourth clutches CL3 and CL4 operate as the integrated unit of the first and second planetary gear sets PG1 and PG2.

The first brake B1 is disposed between the first sun gear S1 and the transmission housing H, allowing the first sun gear S1 to selectively act as a fixed element.

The second brake B2 is disposed between the first planet carrier PC1 fixedly connected to the torque mediating shaft TMS and the transmission housing H, and allows the first planet carrier PC1 to be selectively acted as a fixed element.

The engagement elements of the engine clutch ECL, the first, second, third, and fourth clutches CL1, CL2, CL3 and CL4 and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

The first and second synchronizers SN1 and SN2 may be formed as a known scheme, and the first and second sleeves SLE1 and SLE2 applied to the first and second synchronizers SN1 and SN2 may be operated by respective actuators which may be controlled by a transmission control unit.

FIG. 2 is a shifting operation chart for a power transmission apparatus configured for a vehicle according to the exemplary embodiment of the present invention, and the power transmission apparatus configured for a vehicle according to the exemplary embodiment performs shifting operation as follows.

[Engine and Parallel Mode Reverse Speed]

In engine and parallel mode reverse speed REV, as shown in FIG. 2, the intermediate shaft CS and the third drive gear IDG3 are synchronously connected by the sleeve SLE2 of the second synchronizer SN2, and the engine clutch ECL and the first and fourth clutches CL1 and CL4 are operated.

As such, a partial torque of the engine ENG is input to the second ring gear R2 of the third shifting section TM3 reversed in rotation direction through the third input shaft IS3, the first gear set GL1, the intermediate shaft CS, the second synchronizer SN2, the third gear set GL3, the idle shaft IDS, the fourth gear set GL4, and the second gear set GL2.

And by the operation of the fourth clutch CL4, the second planetary gear set PG2 integrally rotates, thus the second planetary gear set PG2 outputs torque to the differential DIFF through the output shaft OS as inputted from the second ring gear R2.

[Engine and Parallel Mode First Forward Speed]

In the engine and parallel mode first forward speed FD1, the torque mediating shaft TMS and the intermediate drive gear ICDG are synchronously connect by the sleeve SLE1 of the synchronizer SN1, and the engine clutch ECL, the fourth clutch CL4 and the first brake B1 are operated.

As such, the torque of the engine ENG is input to the first ring gear R1 of the second shifting section TM2 through the first input shaft IS1, the first sun gear S1 is acted as a fixed element by the operation of the first brake B1, and thus the first planet carrier PC1 outputs a reduced rotation speed.

The reduced rotation speed of the first planet carrier PC1 is transferred to the second ring gear R2 of the third shifting section TM3 through the torque mediating shaft TMS and the second gear set GL2, and in the third shifting section TM3, the second planetary gear set PG2 integrally by the operation of the fourth clutch CL4. So that the second planetary gear set PG2 outputs to the differential DIFF through the output shaft OS as inputted to the second ring gear R2, realizing the first forward speed FD1.

In the first forward speed, shifting is performed according to the gear ratio of the first planetary gear set PG1 and the gear ratio of the second gear set GL2.

[Engine and Parallel Mode Second Forward Speed]

In the engine and parallel mode second forward speed FD2, the torque mediating shaft TMS and the intermediate drive gear ICDG are synchronously connected by the sleeve SLE1 of the first synchronizer SN1, and the engine clutch ECL and the third and fourth clutches CL3 and CL4 are operated.

The torque of the engine ENG is transferred to first ring gear R1 of the second shifting section TM2 through the first input shaft IS1, and in the second shifting section TM2, the first planetary gear set PG1 integrally rotates by the operation of the third clutch CL3 so that the first planetary gear set PG1 outputs a torque to the first planet carrier PC1 and the torque mediating shaft TMS as inputted.

Then the torque output of the torque mediating shaft TMS transferred to the second ring gear R2 of the third shifting section TM3 through the second gear set GL2, and the second planetary gear set PG2 integrally rotates by the operation of the fourth clutch CL4 and the second planetary gear set PG2 outputs the torque to the differential DIFF through the output shaft OS as inputted to the second ring gear R2, realizing the second forward speed FD2.

That is, the shifting is performed according to the gear ratio of the second gear set GL2 at the second forward speed.

[Engine and Parallel Mode Third Forward Speed]

In engine and parallel mode third forward speed FD3, the intermediate shaft CS and the second drive gear IDG2 IDG3 are synchronously connected by the sleeve SLE2 of the second synchronizer SN2, and the engine clutch ECL and the first and the fourth clutches CL1 and CL4 are operated.

As such, the torque of the engine ENG is input to the second ring gear R2 of the third shifting section TM3 by the operation of the first clutch CL1 through the third input shaft IS3, the first gear set GL1, the intermediate shaft CS, the second synchronizer SN2 and the second gear set GL2.

And the second planetary gear set PG2 integrally rotates by the operation of the fourth clutch CL4 so that the second planetary gear set PG2 outputs torque to the differential DIFF through the output shaft OS as inputted from the second ring gear R2, realizing the third forward speed FD3.

That is, at the third forward speed, the shifting is realized according to the gear ratios of the first and second gear sets CL1 and GL2

[Engine and Parallel Mode Fourth Forward Speed]

In the engine and parallel mode fourth forward speed FD4, the first and second synchronizers SN1 and SN2 are neutral, and the engine clutch ECL and the second and fourth clutches CL2 and CL4 are operated.

The torque of the engine ENG is input to the second planet carrier PC2 of the third shifting section TM3 through the second input shaft IS2 and the fifth gear set GL5 by the operation of the second clutch CL2.

And by the operation of the fourth clutch CL4, the second planetary gear set PG2 integrally rotates, thus the second planetary gear set PG2 outputs torque to the differential DIFF through the output shaft OS as inputted, realizing the fourth forward speed FD4.

That is, the fourth forward speed is shifted according to the gear ratio of the fifth gear set GL5

[Engine and Parallel Mode Fifth Forward Speed]

In the engine and parallel mode, the fifth forward speed FD5, the intermediate shaft CS and the second drive gear IDG2 are synchronously connected by the sleeve SLE2 of the second synchronizer SN2, and the engine clutch ECL and the first clutch and second clutch CL1 and CL2 are operated.

As such, a partial torque of the engine ENG is input to the second ring gear R2 of the third shifting section TM3 through the third input shaft IS3, the first gear set GL1, the intermediate shaft CS, the second synchronizer SN2 and the second gear set GL2 by the operation of first clutch CL1.

And by the operation of the second clutch CL2, a partial torque of the engine ENG is input to the second planet carrier PC2 of the third shifting section TM3 through the second input shaft IS2 and the fifth gear set GL5.

As such, torques input through the second ring gear R2 and the second planet carrier PC2 are combined to form a shifted output torque of an increased or decreased rotation speed by the cooperative operation of rotation members of the second ring gear R2 and the second planet carrier PC2, and the shifted output torque is transferred to the differential DIFF through the output shaft OS, realizing the fifth forward speed FD5.

In the fifth forward speed, since the torque according to the gear ratios of the first and second gear sets GL1 and GL2 is transferred to the second ring gear R2 and the torque according to the gear ratio of the fifth gear set G5 is transferred to the second planet carrier PC2, such that the rotation speed is shifted.

[Engine and Parallel Mode Sixth Forward Speed]

In the engine and parallel mode sixth forward speed FD6, the torque mediating shaft TMS and the intermediate drive gear ICDG are synchronously connect by the sleeve SLE1 of the synchronizer SN1, and the engine clutch ECL, the second and third clutches CL2 and CL3 are operated.

As such, the torque of the engine ENG is input to the first ring gear R1 of the second shifting section TM2 through the first input shaft IS1, the first planetary gear set PG1 integrally rotates by the operation of the third clutch CL3 so that the first planetary gear set PG1 outputs a torque to the first planet carrier PC1 and the torque mediating shaft TMS as inputted.

Then the torque output of the torque mediating shaft TMS transferred to the second ring gear R2 of the third shifting section TM3 through the second gear set GL2 and by the operation of the second clutch CL2, a partial torque of the engine ENG is input to the second planet carrier PC2 of the third shifting section TM3 through the second input shaft IS2 and the fifth gear set GL5.

As such, torques input through the second ring gear R2 and the second planet carrier PC2 are combined to form a shifted output torque of an increased or decreased rotation speed by the cooperative operation of rotation members of the second ring gear R2 and the second planet carrier PC2, and the shifted output torque is transferred to the differential DIFF through the output shaft OS, realizing the sixth forward speed FD6.

That is, the sixth forward speed is shifted according to the gear ratios of the second gear set GL2 and the fifth gear set GL5

[Engine and Parallel Mode Seventh Forward Speed]

In the engine and parallel mode seventh forward speed FD7, the torque mediating shaft TMS and the intermediate drive gear ICDG are synchronously connected by the sleeve SLE1 of the first synchronizer SN1, and the engine clutch ECL, the second clutch CL2 and the first brake B1 are operated.

A partial torque of the engine ENG is transferred to first ring gear R1 of the second shifting section TM2 through the first input shaft IS1, and in the second shifting section TM2, the first sun gear S1 is acted as a fixed element by the operation of the first brake B1, and thus the first planet carrier PC1 outputs a reduced rotation speed and the reduced rotation speed of the first planet carrier PC1 is transferred to the second ring gear R2 of the third shifting section TM3 through the torque mediating shaft TMS and the first synchronizer SL1 and the second gear set GL2.

And by the operation of the second clutch CL2, a partial torque of the engine ENG is input to the second planet carrier PC2 of the third shifting section TM3 through the second input shaft IS2 and the fifth gear set GL5.

As such, torques input through the second ring gear R2 and the second planet carrier PC2 are combined to form a shifted output torque of an increased or decreased rotation speed by the cooperative operation of rotation members of the second ring gear R2 and the second planet carrier PC2, and the shifted output torque is transferred to the differential DIFF through the output shaft OS, realizing the seventh forward speed FD7.

In the seventh forward speed, since the torque of the second shifting section TM2 is transferred to the second ring gear R2 and the torque according to the gear ratio of the fifth gear set G5 is transferred to the second planet carrier PC2, such that the rotation speed is shifted.

[Engine and Parallel Mode Eighth Forward Speed]

In the engine and parallel mode eighth forward speed FD8, the torque mediating shaft TMS and the intermediate drive gear ICDG are synchronously connect by the sleeve SLE1 of the synchronizer SN1, and the engine clutch ECL, the second clutch CL2 and the second brake B2 are operated.

By the operation of the second brake B2, the first planet carrier PC1 is acted as a fixed element, and also the torque mediating shaft TMS and the second gear set GL2 fixedly connected to the first planet carrier PC1 does not rotate.

At a state the second ring gear R2 fixedly connected to the second driven gear IPG2 of the second gear set GL2 is acted as a fixed element, by the operation of the second clutch CL2, the torque of the engine ENG is input to the second planet carrier PC2 of the third shifting section TM3 through the second input shaft IS2 and the fifth gear set GL5, and increased rotation speed is transferred to the differential DIFF through the output shaft OS, realizing the eighth forward speed FD8.

In the eighth forward speed, since the second ring gear R2 of the second planetary gear set PG2 is acted as the fixed element, the increased rotation speed than in the seventh forward speed is realized.

[Engine and Parallel Mode Ninth Forward Speed]

In the engine and parallel mode ninth forward speed FD9, the intermediate shaft CS and the third drive gear IDG3 are synchronously connected by the sleeve SLE2 of the second synchronizer SN2, and the engine clutch ECL and the first clutch and second clutch CL1 and CL2 are operated.

As such, a partial torque of the engine ENG is input to the second ring gear R2 of the third shifting section TM3 reversed in rotation direction through the third input shaft IS3, the first gear set GL1, the intermediate shaft CS, the second synchronizer SN2, the third gear set GL3, the idle shaft IDS, the fourth gear set GL4, and the second gear set GL2.

By the operation of the second clutch CL2, a partial torque of the engine ENG is input to the second planet carrier PC2 of the third shifting section TM3 through the second input shaft IS2 and the fifth gear set GL5.

Since the second ring gear R2 reversely rotates and the torque of the engine ENG is input to the second planet carrier PC2 of the third shifting section TM3, increased rotation speed is transferred to the differential DIFF through the output shaft OS, realizing the ninth forward speed FD9.

That is, the second ring gear R2 reversely rotates and the torque of the engine ENG is input to the second planet carrier PC2, so that the increased rotation speed than in the eighth forward speed is realized.

In the above description of the "engine and parallel mode", only the engine ENG is exampled as a power source. However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shifting stages of nine forward speeds of the first forward speed FD1 to the ninth forward speed FD9 may be obtained by the same operational chart.

A power transmission apparatus configured for a vehicle according to an exemplary embodiment of the present invention may realize multiple shifting stages by adding two planetary gear sets in a dual clutch transmission structure and simplify its internal structure by reducing the number of components, improving fuel economy by minimizing the weight, and improve the mountability by reducing the volume.

Also, the power transmission apparatus may achieve the vehicle to run in an engine driving mode, an electric vehicle mode and a parallel hybrid mode by adding one motor/generator.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle, the power transmission apparatus comprising:
    an engine including an engine output shaft;
    a motor/generator selectively connectable to the engine output shaft;
    a first input shaft fixedly connected to the motor/generator;
    a second input shaft formed as a hollow shaft, coaxially and rotatably mounted on a first portion of the first input shaft without rotational interference between the first input shaft and the second input shaft, and selectively connectable to the first input shaft;
    a third input shaft formed as a hollow shaft, coaxially and rotatably mounted on the second input shaft without rotational interference between the second input shaft and the third input shaft, and selectively connectable to the first input shaft;
    a torque mediating shaft formed as a hollow shaft and coaxially and rotatably mounted on a second portion of the first input shaft without rotational interference between the first input shaft and the torque mediating shaft;
    an intermediate shaft mounted in parallel with the first input shaft;
    an idle shaft mounted in parallel with the first input shaft;
    an output shaft mounted in parallel with the first input shaft and outputting an output torque;
    a first shifting section including first, second, third, and fourth gear sets, wherein the first shifting section is configured for selectively receiving a torque from the third input shaft, shifting the received torque and outputting the shifted torque;
    a second shifting section including a first planetary gear set having a plurality of rotation elements including a first ring gear fixedly connected to the first input shaft, wherein the second shifting section is configured for shifting a torque received from the first input shaft to the torque mediating shaft in reduced rotation speed or as inputted, or for stopping a rotation of the torque mediating shaft; and
    a third shifting section including a fifth gear set and a second planetary gear set having a plurality of rotation elements including a second sun gear fixedly connected to the output shaft, wherein the third shifting section is configured for selectively receiving a torque from the first and second shifting sections through the second gear set and a torque from the second input shaft through the fifth gear set and for outputting shifted torque to the output shaft.

2. The power transmission apparatus of claim 1,
wherein the first gear set includes a first drive gear fixedly connected to the third input shaft, and a first driven gear fixedly connected to the intermediate shaft and gear-meshed with the first drive gear;
wherein the second gear set includes a second drive gear coaxially and rotatably mounted on the intermediate shaft, an intermediate drive gear coaxially and rotatably mounted on the torque mediating shaft and gear-meshed with second drive gear, a second driven gear fixedly connected a second ring gear among the plurality of rotation elements of the second planetary gear set and gear-meshed with the intermediate drive gear;
wherein the third gear set includes a third drive gear coaxially and rotatably mounted on the torque mediating shaft and a third driven gear fixedly connected to the idle shaft and gear-meshed with the third drive gear;
wherein the fourth gear set includes a fourth drive gear which is fixedly connected to the idle shaft and gear-meshed with the intermediate drive gear; and
wherein the fifth gear set includes a fifth drive gear fixedly connected to the second input shaft and a fifth driven gear fixedly connected to a second planet carrier along the plurality of rotation elements of the second planetary gear set and gear-meshed with the fifth drive gear.

3. The power transmission apparatus of claim 2,
wherein the intermediate drive gear is selectively connectable with the torque mediating shaft through a first synchronizer; and
wherein the second drive gear or the third drive gear is selectively connectable to the intermediate shaft through a second synchronizer.

4. The power transmission apparatus of claim 1,
wherein the plurality of rotation elements of the first planetary gear set further includes:
a first planet carrier fixedly connected to the torque mediating shaft and selectively connectable to a transmission housing; and
a first sun gear selectively connectable to the transmission housing.

5. The power transmission apparatus of claim 4, further including:
a first brake mounted between the first sun gear and the transmission housing; and
a second brake mounted between the first planet carrier and the transmission housing.

6. The power transmission apparatus of claim 4, wherein the first planetary gear set is a single pinion planetary gear set.

7. The power transmission apparatus of claim 4,
wherein the plurality of rotation elements of the second planetary gear set further includes:
a second ring gear receiving torques from the first and second shifting sections; and
a second planet carrier receiving torque from the second input shaft, and
wherein the second sun gear fixedly connected to the output shaft is selectively connectable to the second ring gear.

8. The power transmission apparatus of claim 7, wherein the second planet carrier of the second planetary gear is engaged to the fifth gear set.

9. The power transmission apparatus of claim 7, further including:
a clutch mounted between the second ring gear and the output shaft.

10. The power transmission apparatus of claim 7, wherein the second planetary gear set is a single pinion planetary gear set.

11. The power transmission apparatus of claim 7, further including:
five clutches each selectively connecting a corresponding pair among the first to third shafts, the engine output shaft and the output shaft, a shaft among the first to third shafts, the engine output shaft and the output shaft and a rotation element among the plurality of rotation elements of the first planetary gear set and the plurality of rotation elements of the first planetary gear set, or a corresponding pair of rotation elements among the plurality of rotation elements of the first planetary gear set and the plurality of rotation elements of the first planetary gear set; and
two brakes selectively connecting a rotation element among the plurality of rotation elements of the first planetary gear set and the plurality of rotation elements of the first planetary gear set to the transmission housing.

12. The power transmission apparatus of claim 11,
wherein the five clutches comprise:
an engine clutch mounted between the engine output shaft and the first input shaft;
a first clutch mounted between the first input shaft and the third input shaft;
a second clutch mounted between the first input shaft and the second input shaft;
a third clutch mounted between the first input shaft and the first ring gear and between the first input shaft the first planet carrier; and
a fourth clutch mounted between the second ring gear and the output shaft; and
wherein the two brake includes:
a first brake mounted between the first sun gear and the transmission housing; and
a second brake mounted between the first planet carrier and the transmission housing.

* * * * *